United States Patent [19]
Sato

[11] Patent Number: 5,222,995
[45] Date of Patent: Jun. 29, 1993

[54] FISHING REEL WITH SEESAW OPERATING CLUTCH CONTROL MEMBER

[75] Inventor: Jun Sato, Osaka, Japan

[73] Assignee: Shimano, Inc., Osaka, Japan

[21] Appl. No.: 787,755

[22] Filed: Nov. 5, 1991

Related U.S. Application Data

[63] Continuation of Ser. No. 446,105, Dec. 5, 1989, abandoned.

[30] Foreign Application Priority Data

Dec. 9, 1988 [JP] Japan .................. 63-160659[U]

[51] Int. Cl.⁵ .................................. A01K 89/033
[52] U.S. Cl. .................................. 242/258; 242/262
[58] Field of Search .................... 242/258-262

[56] References Cited

U.S. PATENT DOCUMENTS

| | | | |
|---|---|---|---|
| 3,699,236 | 10/1972 | Kodaira | 200/553 |
| 4,369,936 | 1/1983 | Noda | 242/261 |
| 4,564,158 | 1/1986 | Moosberg et al. | 242/261 |
| 4,824,046 | 4/1989 | Emura et al. | 242/261 |
| 4,924,047 | 5/1990 | Tsuge | 200/553 |
| 4,964,590 | 10/1990 | Sato | 242/261 |

Primary Examiner—Daniel P. Stodola
Assistant Examiner—John Q. Nguyen
Attorney, Agent, or Firm—Dickstein, Shapiro & Morin

[57] ABSTRACT

A fishing reel having a pair of side frames, a spool pivotably supported between the side frames, a drive mechanism for rotating the spool, a clutch for selectively connecting and disconnecting power transmission between the spool and the drive mechanism and a clutch control member attached to one of the side frames. According to the improvement, the clutch control member includes a pair of control portions to be selectively depressed for engaging or disengaging the clutch. The control member is pivotably supported to the one side frame such that depression of one of the control portions causes projection of the other from an outer surface of the side frame, and the projected control portion is stopped at a position higher than that of the depressed control portion relative to the outer surface. With the improvement of the invention, the user can readily and reliably recognize the present condition, i.e., engagement or disengagement of the clutch, and can also quickly operate the clutch continously in succession without change of his hands.

1 Claim, 3 Drawing Sheets

FISHING REEL WITH SEESAW OPERATING CLUTCH CONTROL MEMBER

This application is a continuation of application Ser. No. 07/446,105 filed Dec. 5, 1989, now abandoned.

BACKGROUND OF THE INVENTION

1. Field of the Invention

The present invention relates to a fishing reel including a pair of opposed side frames, a spool rotatably supported between the side frames, a drive mechanism for rotating the spool, a clutch for selectively connecting and disconnecting power transmission between the spool and the drive mechanism, and a control member attached to one side frame for controlling the clutch.

2. Description of the Related Art

In a typical conventional fishing reel of the above-noted type, the control member for controlling the clutch is constructed as a lever member pivotably attached to an outer face of one of the opposed pair of side frames. In a further conventional fishing reel as disclosed in a Japanese published patent gazette No. 55-32334 for example, the control member is constructed as a push button operated only for a declutching operation while a clutching operation is effected by rotation of a handle operatively connected to the spool.

With the first-mentioned conventional reel, the stop position of the control lever must be recognized solely by finger feel of the user. As such, the user often finds it difficult to feel, i.e. to recognize whether the clutch is presently engaged or disengaged. Further, since the user must bend his finger to reverse the control lever, a quick clutch operation is impossible.

With the second-mentioned reel, a clutch operation requires the user's finger movement between the control button and the spool handle. The necessity of such finger movement hinders quick and smooth clutch operation particularly when the operation has to take place repeatedly in series. Further, like the first-mentioned reel, it is rather difficult for the user to recognize the current state of the clutch solely by his feeling of projection/depression of the control button.

With view to the above-described shortcomings of the prior art, the primary object of the present invention is to provide an improved fishing reel of the above-noted type which enables the user to more reliably recognize the present state of the clutch and also enables him to operate the clutch repeatedly and continuously with great ease and increased speed.

SUMMARY OF THE INVENTION

In order to accomplish the above-described object, a fishing reel related to the present invention comprises: a pair of opposed side frames; a spool rotatably supported between the side frames; a drive mechanism for rotating the spool; a clutch for selectively connecting and disconnecting power transmission between the spool and the drive mechanism; and a control member attached to one of the side frames for controlling the clutch; the control member including a pair of control portions to be alternately depressed for engaging or disengaging the clutch, the control member being pivotably supported to said one side frame such that depression of one of the pair of control portions causes projection of the other from an outer surface of the side frame, with the projected control portion being stopped at a position higher than that of the depressed control portion relative to the outer surface.

With the above feature of the invention, the control portions of the control member are operable by alternate depression of the same which operation is convenient and efficient in the human engineering point of view. And, both a clutch engaging operation and a clutch disengaging operation can be effected by selective and alternate pressing operation of these control portions. As a result, either clutch operation can be effected with great ease and speed. Further, since depression of one control portion automatically causes projection and stop of the other at a position higher than that of the former relative to the outer surface of the side frame, the user can readily recognize whether the clutch is currently engaged or disengaged. Moreover, since the control portions are provided as a pair each corresponding to the clutch engaging or disengaging operation, the user can easily effect the operations speedily and continuously simply by sliding his finger back and forth over and between these control portions.

As described above, the present invention has fully achieved its intended object of providing an improved fishing reel which enables the user to more reliably recognize the present state of the clutch and also enables him to operate the clutch repeatedly and continuously with great ease and increased speed.

According to one preferred embodiment of the present invention, the pair of control portions are constructed so that the depression of either control portion stops at a position at least substantially level with or lower than the outer surface of the side frame. This arrangement is advantageous for providing the user with even surer and clearer recognition of the current clutch condition with reference to the level sameness or difference between the depressed control portion and the outer surface of the side frame.

According to a further embodiment of the present invention, the control member is pivotably supported within a recess formed in the side frame. This arrangement is similarly advantageous for enabling the user to further clearly recognize the current clutch condition, since the projection of the control portion will take place more conspicuously from the outer surface of the side frame.

According to a still further embodiment of the present invention, the control member is pivotably fitted on a shaft disposed substantially in parallel with the spool shaft. This arrangement is advantageous for making it easier for the user to operate the clutch control member by using the thumb of his hand gripping the reel body.

According to a still further embodiment of the invention, the one side frame includes two gently arcuate faces continuous with each other across a ridge while the pair of control portions of the control member include a pair of gently arcuate faces continuous with each other across a recessed border, with the control member being pivotably supported to the one side frame so that the recessed border of the former is positioned adjacent the ridge of the latter. This arrangement is advantageous in that the projected control portion may be more distinctly distinguished from the depressed control portion across the border between the control portions and also across the ridge of the side frame which is positioned adjacent the border. As a result, the user's recognition is further facilitated and assured.

Further and other objects, features and effects of the invention will become apparent from the following more detailed description of the embodiments of the invention with reference to the accompanying drawings.

BRIEF DESCRIPTION OF THE DRAWINGS

Accompanying drawings FIGS. 1 through 4 illustrate a fishing reel related to the present invention; in which, FIG. 1 is a vertical section view showing a forwardly operated condition of a clutch lever of the fishing reel, FIG. 2 is a vertical section view showing a reversely operated condition of the clutch lever, FIG. 3 is a view showing the entire fishing reel, and FIG. 4 is a partially cutout section view showing an entire inner construction of the fishing reel.

DESCRIPTION OF THE PREFERRED EMBODIMENTS

Figure 4:
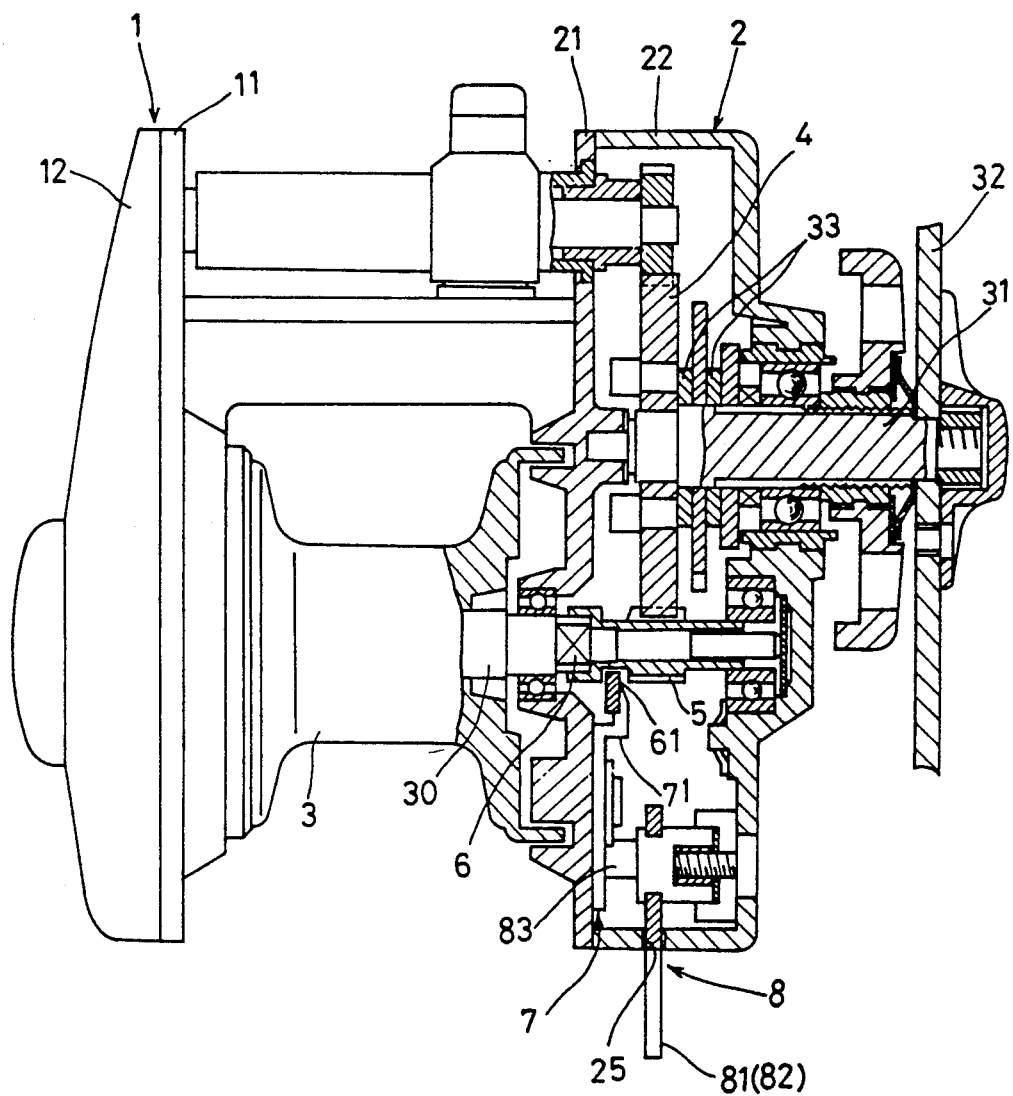

Referring to FIG. 4, a fishing reel related to the present invention includes a pair of first and second side frames 1 and 2 disposed in opposition across a spool 3. The first side frame 1 is consisted essentially of a first side plate 11 and a first bowl-shaped cover 12 disposed adjacent and outside the first side plate 11. Whereas, the second side frame 2 is consisted essentially of a second side plate 21 and a second bowl-shaped cover 22 disposed adjacent and outside the second side plate 21. Between these side frames 1 and 2, there is rotatably supported the spool 3 fitted on a spool shaft 30. Inside the second bowl-shaped cover 22 of the second side frame 2, there is rotatably supported a handle shaft 31 mounting thereon a master gear 4. The handle shaft 31 has one longitudinal end thereof projected outwardly from the cover 22 to fixedly mount thereon a control handle 32. On the other hand, one longitudinal end of the spool shaft 30 is extended into the inside of the cover 22 and this shaft extension rotatably and axially moveably mounts thereon a pinion gear 5 meshable with the master gear 4. These together constitute a spool drive mechanism.

Between the pinion gear 5 and the spool shaft 30, there is interposed a clutch 6 as well as a clutch lever 7 which reciprocal movement selectively causes engagement and disengagement of the clutch 6. That is, with engagement of this clutch 6, rotational power transmitted to the handle shaft 31 from the handle 32 is further transmitted via the master gear 4, the pinion gear 5 and the clutch 6 to the spool shaft 30 for causing rotation of the spool 3. On the other hand, with disengagement of the clutch 6, the rotational power transmission between the handle shaft 31 to the spool shaft 30 is broken to maintain the spool 3 freely rotatable.

The master gear 4 is loosely fitted on the handle shaft 31 with a plurality of mutually unrotatable friction plates 33 being interposed therebetween. Accordingly, the rotational power from the handle shaft 31 is transmitted through these friction plates 33 to the master gear 4.

The clutch 6 is consisted essentially of a flat face portion formed longitudinally intermediately of the spool shaft 30 and a cylindrical portion engaging with the flat face portion and formed on the side of the pinion gear 5. In operation, with an operation on the clutch lever 7, the cylindrical portion on the side of the pinion gear 5 and the flat face portion on the side of the spool shaft 30 are engaged with or disengaged from each other, thereby to selectively engage and disengage the clutch 6.

Figure 1:
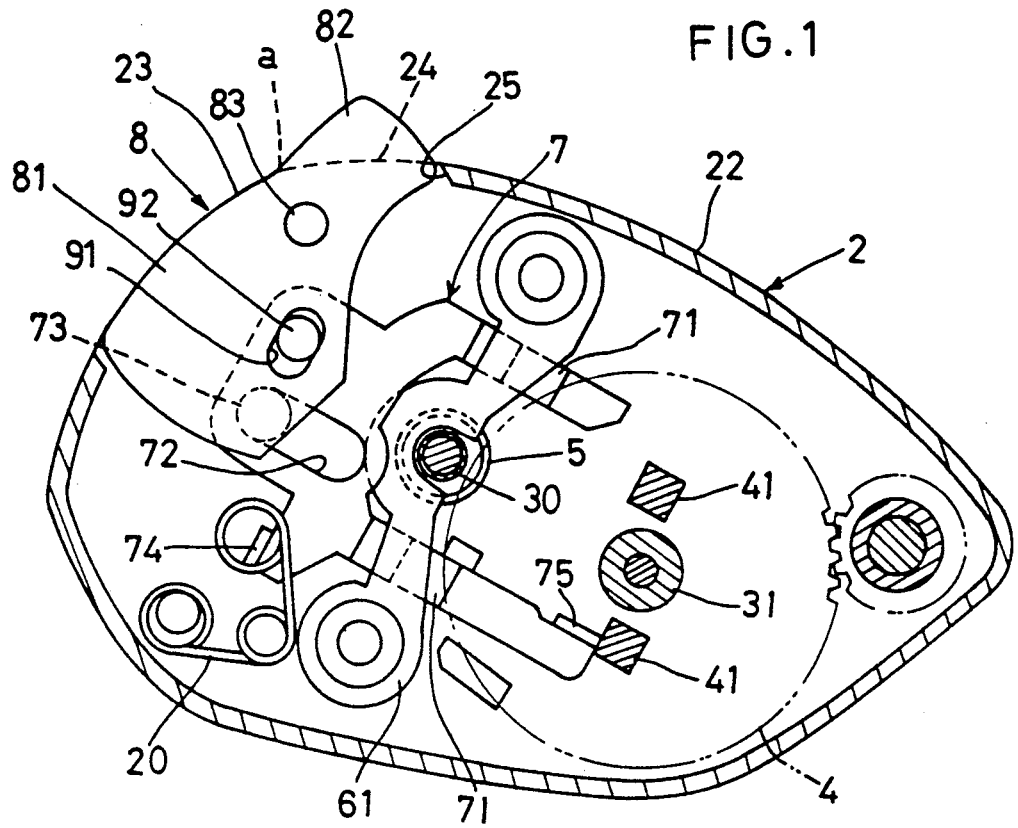
Figure 2:
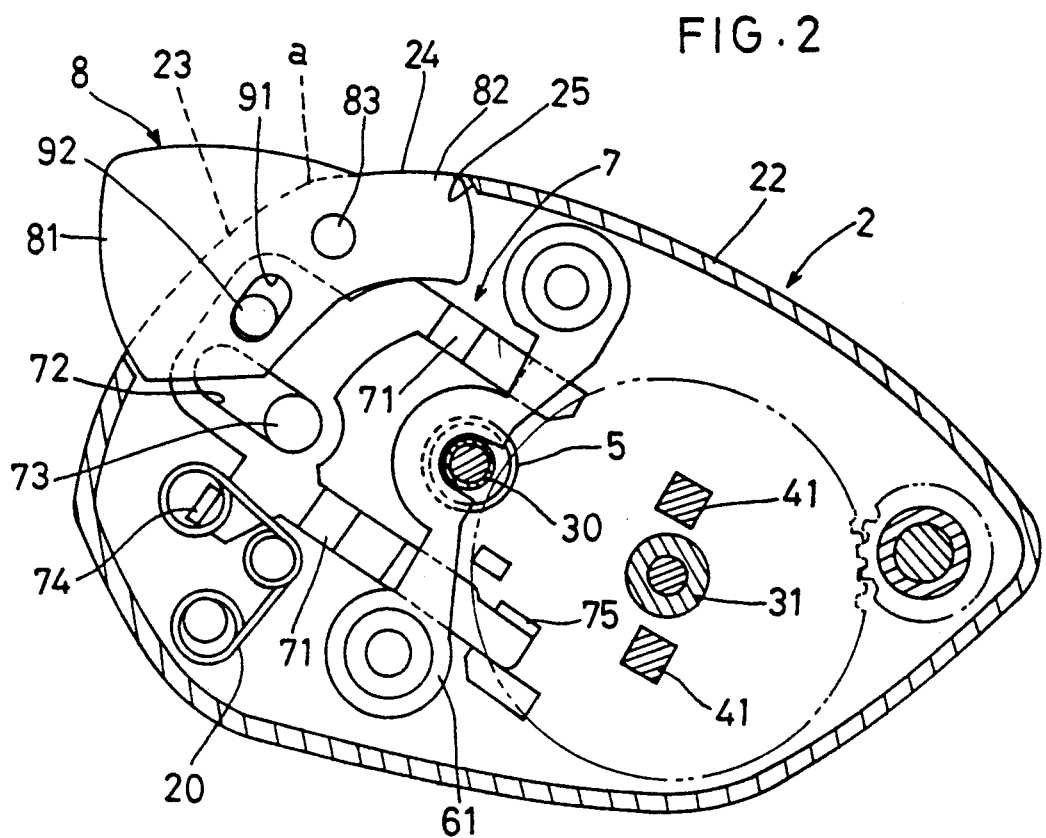
Figure 3:
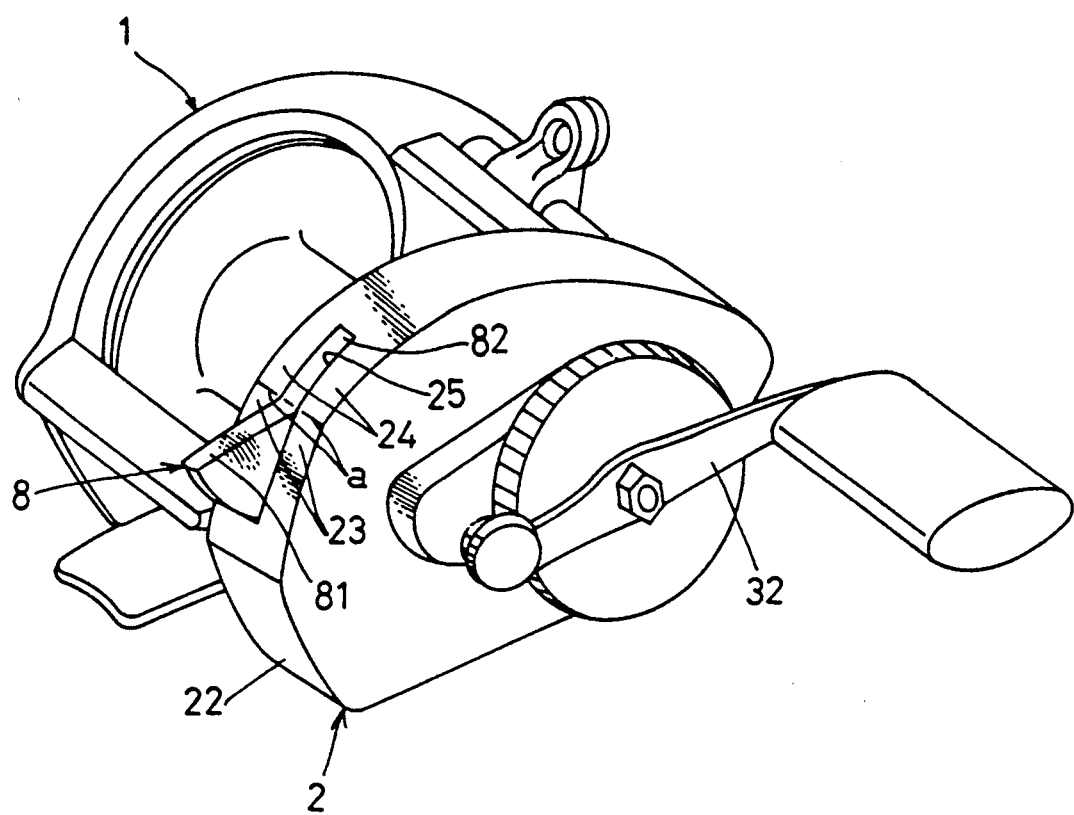

About the outer periphery of the pinion gear 5, there is provided a clutch yoke 61 which is normally placed in abutment against the pinion gear 5 for urging the clutch 6 for engagement. Then, as the yoke 61 is moved by a reciprocal operation of the clutch lever 7, the clutch 6 is selectively engaged and disengaged. As shown in FIGS. 1 and 2, the clutch lever 7 is formed like a fork having a pair of pressing portions 71 for pressing the yoke 61 and defines, at a position displaced relative to an axis of the spool shaft 30, an elongated slot 72 extending along the moving direction of the clutch lever 7. Into this elongated slot 72, there is inserted a shaft element 73 fixed to the second side frame 2 and adapted for reciprocatively supporting the clutch lever 7. Further, a spring receiver element 74 is attached to the clutch lever 7. Also, a torsion spring 20 is interposed between the spring receiver element 74 and the side plate 21 of the second side frame 2. The torsion spring 20 urges the clutch lever 7, and the clutch lever 7 is selectively stopped either at a forward position or a reverse position.

The second side frame 2 pivotably supports a clutch control member 8 having a forward control portion 81 and a reverse control portion 82 formed continuously with the forward control portion 81.

Further, a link mechanism is provided for operatively connecting the clutch lever 7 with the clutch control member 8, such that the clutch 6 is engaged or disengaged with a selective depressing operation on the forward control portion 81 or on the reverse control portion 82 of the control member 8.

The clutch control member 8 is formed of a thin plate of e.g. synthetic resin including at opposite longitudinal sides thereof the forward control portion 81 and the reverse control portion 82 each having a gently arcuate outer surface. These gently arcuate outer surfaces of the control portions 81 and 82 are formed continuously with each other across a recessed border. On the other hand, the bowl-shaped cover 22 of the second side frame 2 includes, at upper positions on its outer periphery, a first finger-contact face 23 and a second finger-contact face 24 having a gently arcuate curve and formed continously with each other across a ridge 'a'. Also, there is defined a cutout hole 25 extending between the first finger-contact face 23 and the second finger-contact face 24. The clutch control member 8 is disposed inside this cutout hole 25 in such a manner that the recessed border between the forward control portion 81 and the reverse control portion 82 of the member 8 is located adjacent the ridge 'a' of the bowl-shaped cover 22. Further, at an intermediate position between the control portions 81 and 82, there is inserted a pivot shaft 83 supported adjacent the ridge 'a' for vertically pivotably supporting the clutch control member 8.

Moreover, the clutch control member 8 is pivotably supported to the second side frame 2 so that with depression of either of the control portions 81 and 82 the undepressed control portion 81 or 82 may project further outwardly from the cutout hole 25 through the cover 22 than the depressed control portion 82 or 81. That is to say, the clutch control member 8, i.e. its control portions 81 and 82 pivot like a seesaw relative to the second side frame 2. Also, when the forward control portion 81 is depressed, the reverse control portion 82 becomes substantially level with the first finger-contact face 23. On the other hand, when the reverse control portion 82 is depressed, the forward control portion 81 becomes substantially level with the second finger-contact face 24. With these arrangements, the user can smoothly and easily operate these control portions 81 and 82 by sliding his finger back and forth over and along the finger-contact faces 23 and 24. Further, since the ridge line 'a' of the second side frame 2 assures a sufficient pivotal stroke for the clutch control member 8, this control member 8 can have a simple configuration such as the approximately rectangular configuration illustrated in the drawings, rather than such a complicated configuration as a butterfly nut. Such simple configuration of the control member 8 is advantageous for facilitating the manufacture and reducing the manufacturing costs through efficient utilization of the raw material when the control member 8 is punched out from e.g. a single sheet metal.

The aforementioned link mechanism for operatively connecting the clutch lever 7 with the clutch control member 8 is consisted essentially of an elongated slot 91 opened substantially vertically at a position displaced radially relative to the fulcrum of the pivot shaft 83 for the control member 8 and a stopper pin 92 attached on the clutch lever 7 to project through the elongated slot 91. Then, as either the control portion 81 or 82 of the clutch control member 8 is depressed, the elongated slot 91 pushes the stopper pin 92, thereby to move the clutch lever 7 back and forth. With the above construction, when the forward control portion 81 is pivotably depressed about the pivot shaft 83 as illustrated in FIG. 1, the stopper pin 92 is moved downwardly via the elongated slot 91, with which the clutch lever 7 is moved forwardly such that its pressing portion 71 moves the clutch yoke 61 to disengage the clutch 6. Conversely, as illustrated in FIG. 2, when the reverse control portion 82 is pivotably depressed about the pivot shaft 83, the stopper pin 92 is moved upwardly via the elongated slot 91, with which the clutch lever 7 is moved reversely such that its pressing portion 71 stops pressing the yoke 61 and the yoke 61 resiles to engage the clutch 6.

A clutch return mechanism is provided for engaging a disengaged clutch 6 upon rotation of the handle 32. This mechanism includes two return projections 41 formed on a side face of the master gear 4 and a contact portion 75 contactable with either of the return projections 41 and formed on a leading end of the one pressing portion 71 of the clutch lever 7. In operation, when the clutch lever 7 is moved forwardly by the forward control portion 81 of the clutch control member 8, the contact portion 75 moves into an area defined by moving paths of the return projections 41.

Accordingly, as the master gear 4 is rotated in operative connection with the handle 32, the return projection 41 pushes back the contact portion 75, thereby to move the clutch lever 7 reversely for engaging the clutch 6. In addition to the rotation of the handle 32, an engaging operation of the clutch 6 is also possible by means of the clutch control member 8. This means that the clutch 6 can be engaged without rotational operation of the handle 32 which operation requires a change of hands one for holding the reel body and the other for holding the handle. Consequently, the clutch 6 can be operated very efficiently.

Some alternate embodiments of the invention will be specifically described next.

I. In the foregoing embodiment, the forward control portion 81 and the reverse control portion 82 are formed continous, i.e. integral with each other in the clutch control member 80. Alternately, these control portions can be formed as separate entities.

II. In the foregoing embodiment, each of the control portions 81 and 82 has a gently arcuate outer surface. Instead, these outer surfaces can be formed flat or in any other convenient manner. Similarly, the first and second finger-contact faces 23 and 24 of the second side frame 2 can be configurated differently depending on the convenience.

III. In the foregoing embodiment, the clutch control member 8 is attached to the second side frame 2 accommodating therein the clutch 6. Instead, the member 8 can be attached to the first side frame 1 which does not accommodate the clutch 6 therein.

IV. In the foregoing embodiment, the clutch control member 8 is pivotably disposed inside the cutout hole 25 defined in the second side frame 2. Instead, this clutch control member 8 can be pivotably supported to a lateral side of either of the first and second side frames 1 and 2.

V. In the foregoing embodiment, the depressed control portion 81 or 82 becomes level with the first and second finger-contact faces 23, 24, respectively. Instead, it is also possible to arrange so that the depressed control portion stops at a position lower than the first or second finger-contact face, i.e. at a position recessed into the interior of the second side frame 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel for use by an angler, said fishing reel comprising:
   a pair of side frames, one of said side frames having an outwardly projecting ridge at a rear position opposed to an attaching portion of said fishing reel to a fishing rod and further having two outer side faces extending continuously with each other across said ridge;
   a handle;
   a spool rotatably mounted on a spool shaft between said pair of side frames;
   a drive mechanism for rotating said spool;
   a clutch for selectively providing engagement and disengagement between said spool and said drive mechanism; has said drive mechanism including said handle and a friction transmission means for transmitting a rotational force from said handle to said clutch by means of friction;
   a cutout formed in said outer side faces of said one of said side frames positioned adjacent said handle and extending from an approximately uppermost portion of said side frame to a portion adjacent a rear end of the side frame;
   a control member pivotably supported to said one side frame and disposed within said cutout, said control member having a pair of control portions for controlling said clutch;
   a control member shaft disposed substantially in parallel with said spool shaft adjacent said ridge;
   a clutch lever slidably supported to said one side frame adjacent the handle, said clutch lever being operatively coupled with said control member so that said clutch lever engages and disengages said clutch as the clutch lever is slid in association with an operation of said control member;

a toggle spring attached to said clutch lever and to said one side frame to hold said clutch selectively at an engaged state and a disengaged state;

wherein said pair of control portions comprise a first control portion for disengaging the clutch, said first control portion facing an angler and a second control portion for engaging the clutch, a distance between said control member shaft to a free end of said first control portion being longer than a distance between said control member shaft and a free end of said second control portion;

said first and second control portions being pivotably supported on said control member shaft in order to allow said first and second control portions to alternately project relative to one of said outer side faces of said one side frame;

said first and second control portions being pivotable in unison about said control member shaft such that depression of one of the control portions causes the other control portion to project relative to said outer side face adjacent thereto, and said depressed control portion being positioned substantially flush relative to the other side face adjacent thereto, said control portions being held in this position.

* * * * *